Aug. 29, 1967 C. H. CRAWFORD 3,339,056
MACHINE AND METHOD OF APPLYING METAL LAYER
Filed June 6, 1966 3 Sheets-Sheet 2

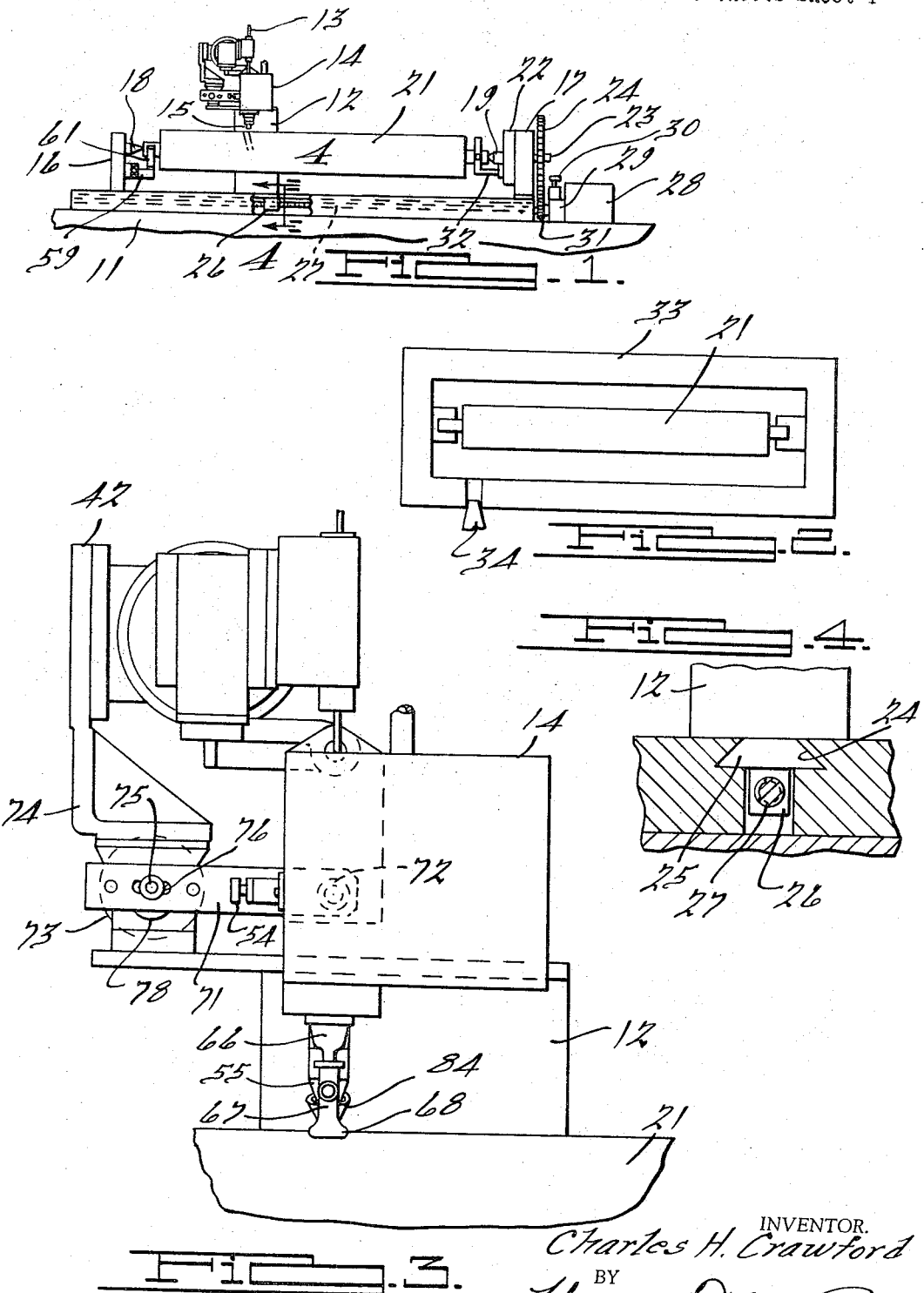

INVENTOR.
Charles H. Crawford
BY
Carness, Dickey & Pierce
ATTORNEYS.

Aug. 29, 1967   C. H. CRAWFORD   3,339,056
MACHINE AND METHOD OF APPLYING METAL LAYER
Filed June 6, 1966   3 Sheets-Sheet 3
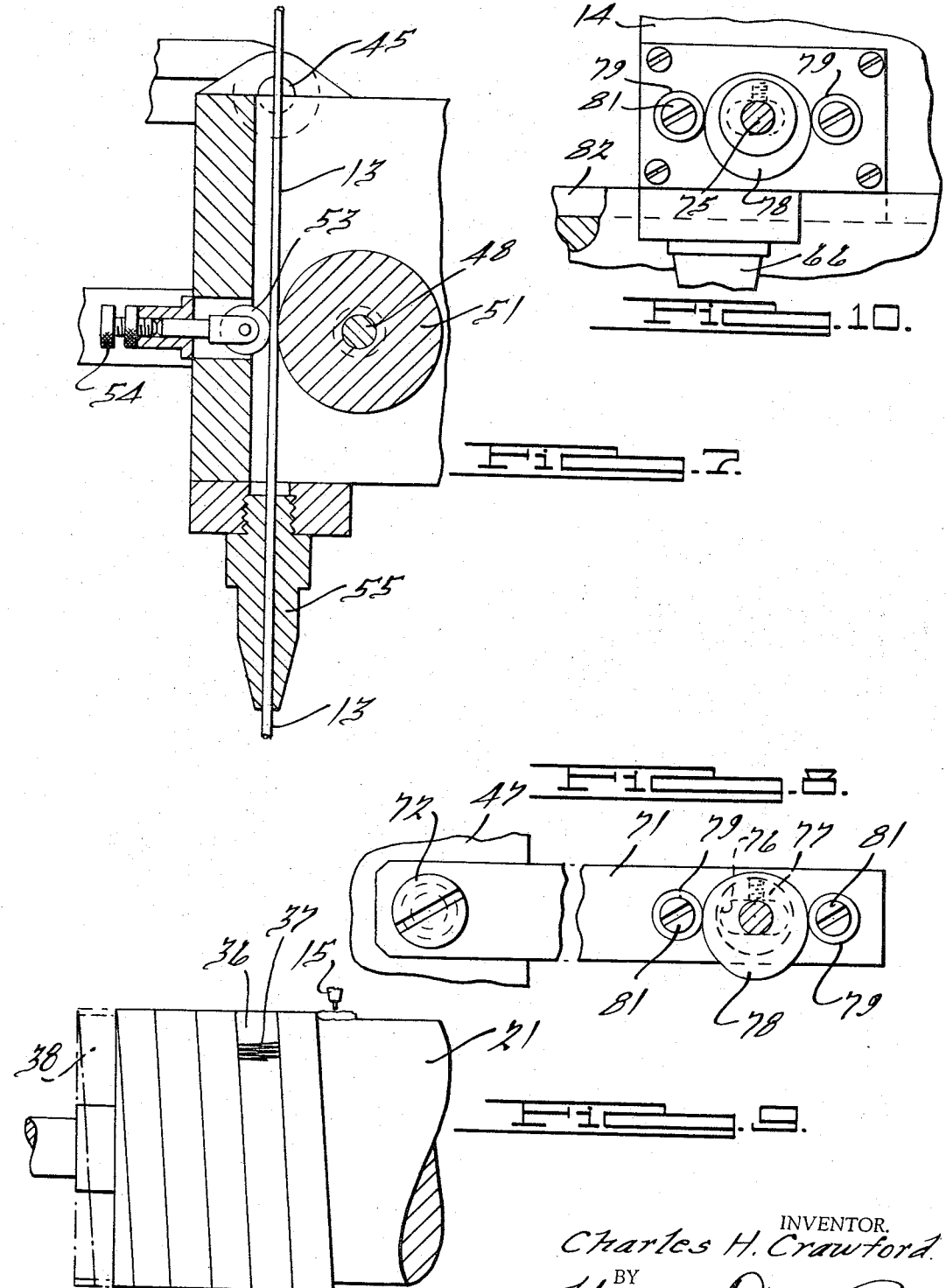
INVENTOR.
Charles H. Crawford
BY
Harness, Dickey & Pierce
ATTORNEYS.

United States Patent Office

3,339,056
Patented Aug. 29, 1967

3,339,056
MACHINE AND METHOD OF APPLYING METAL LAYER
Charles H. Crawford, Grosse Pointe Woods, Mich., assignor to Colonial Broach & Machine Company, Warren, Mich., a corporation of Delaware
Filed June 6, 1966, Ser. No. 555,355
4 Claims. (Cl. 219—76)

This invention relates to welding devices and methods and particularly to a welding device and method which applies a solid layer of material to the surface of a base member.

The present invention pertains to the back and forth movement of a welding head at uniform speed to produce a wide band of metal on the surface of a member having a surface layer applied thereto. The welding wire feeds a powdered metal at such a relative rate as to produce a predetermined metal alloy for the layer. A flux is employed for shielding the arc and insulating the band or strip of welded material.

In one form of the invention the welding head is pivoted to have a moment arm of substantial length and a rotatable cam of predetermined shape produces a uniform speed of movement to the head in both directions of oscillatory advancement. The arm is of substantial length from the pivot to the end of the wire so that little change of position relative to the surface of the member will occur due to the swinging of the end of the wire in an arc during its oscillation. In another form of the invention, where the ribbon of material being laid is much wider, it is desirable to reciprocate the head in ways to maintain the end of the wire parallel to the base material at all times. The same type of cam can be employed to make certain that the movement of the head in the ways is uniform or a double-acting ram can be used to produce the uniform speed of movement.

In the drawing, the workpiece is illustrated as a heavy roll to which the fused layer is applied. With this arrangement the head is mounted on a reciprocable carriage and the roll is mounted for rotation in supports and driven in rotation in synchronism with the movement of the carriage. The weld wire is oscillated along the axis of the roll for a predetermined distance, in the example illustrated, the movement is in the nature of approximately 1⅜ inches. The puddle of the alloy material is laid as a helical band on the surface of the roll and in this manner the edge of the puddle will melt into the edge of the ribbon laid in the prior rotation to unite the bands together and to the material of the roll.

The welding wire is preferably of a low carbon steel, the alloy of which is taken into consideration when mixing the different powder materials so as to produce a desired metal alloy when the metal of the welding wire is added to the molten powder metal. The metal powder is delivered to a hopper having a measuring wheel therein which is driven by the welding wire as it is fed from the head. With this arrangement, an exact proportion of the powder metal will be delivered relative to the metal which will be added thereto by the melting of the wire. The ratio may be 2:1; two parts of the powder metal relative to one part of the wire or the ratio may be varied depending upon the need of more or less of the metal of the wire in the molten puddle to produce a desired alloy. During the formation of the puddle, a neutral flux is fed thereover to shield the arc and to insulate the puddle material.

Preferably, the roll is heated to approximately 450° F. at the starting end so as to be between 400° to 450° at the time the weld is started which heat is maintained by the heat of the arc as the weld progresses along the roll. The upper portion of the powder material is melted by the arc and sufficient heat is generated in the puddle to melt the lower portion of the powder metal and the surface of the roll to unite the metal of the applied metal of the applied layer intimately with the metal of the roll. When a like alloy was applied to a base material no line of demarcation could be noted on a microphotograph between the base material and that applied except for the latter having a slightly finer grain structure. With this process, old rolls can have a new surface of the same or different alloy applied thereto or new rolls made of a cheap base material may have a more expensive material applied as a layer on the surface thereof.

Accordingly, the main objects of the invention are: to apply a wide band of molten metal in a helical path on a roll which melts the edge of the priorly laid band and the surface of the roll to unite therewith; to move a welding wire back and forth along the axis of the roll with a uniform speed of movement to produce a substantially wide band of molten metal as the roll is rotated in synchronism with the advancement of the wire axially of the roll to lay the band in an abutting helical path around the roll; to oscillate a welding wire and a flux discharge nozzle on an area of a roll as it is rotated in synchronism with the advancement of the wire along the roll; to produce a band of a predetermined metal alloy material which is wound helically on the surface of a roll and melted thereinto and into the edge of the band section applied prior thereto, and in general, to provide a welding machine and method for producing a layer of alloy material on a roll or other base element which is simple in construction, positive in operation and economical of manufacture.

Other objects and features of novelty of the invention will be specifically pointed out or will become apparent, when referring for a better understanding of the invention, to the following description taken in conjunction with the accompanying drawings, wherein:

FIGURE 1 is a reduced view in elevation of a machine which practices the method of the present invention;

FIG. 2 is a diagrammatic view of an oven for heating the roll illustrated in FIG. 1;

FIG. 3 is an enlarged view in elevation of the welding head on the machine illustrated in FIG. 1;

FIG. 4 is an enlarged sectional view of the structure illustrated in FIG. 1, taken on the line 4—4 thereof;

FIG. 7 is an enlarged sectional view of the structure illustrated in FIG. 5, taken on the line 7—7 thereof;

FIG. 8 is an enlarged, broken sectional view of the structure illustrated in FIG. 5, taken on the line 8—8 thereof;

FIG. 9 is a broken view of a roll and a helical band of welded material which forms a layer of predetermined metal alloy on the outer surface of the roll, and FIG. 10 is a view of structure similar to that illustrated in FIG. 3, showing another form of the invention.

Figure 5:
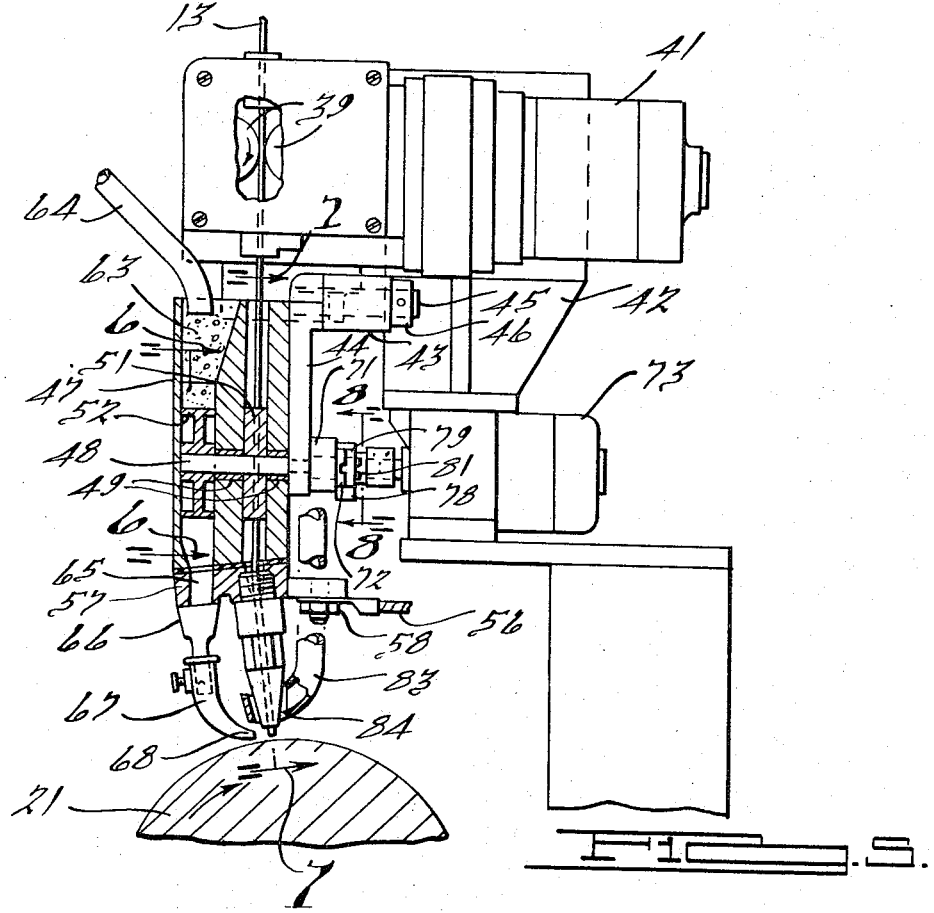
FIG. 5 is an end view of the structure illustrated in FIG. 3, with parts in section and parts broken away.

In FIG. 1, a bed 11 is provided on which a carriage 12 is movable from one to the other end thereof. The carriage supports drive and control means for a brazing wire 13 which is advanced from a coil in the usual manner not herein illustrated. The wire is fed through a hopper 14 to a welding head 15. The base 11 has an upright 16 at one end and a similar upright 17 at the opposite end. A center 18 is mounted on the upright 16 and a center 19 is mounted in a rotatable head 22 on the upright 17. The upright 16 is adjustable toward and from the upright 17 on the bed 11 to have the spacing of the centers conform to the length of the workpiece which is herein illustrated as a roll 21. The rotatable head 22 is driven by a shaft 23 having a gear 24 thereon. The carriage 12, as illustrated in FIG. 4, has a dovetail land 25 retained in a dovetail slot 24 in the base. A boss 26 on the bottom of the land 25 has a threaded aperture for a lead screw 27 which is driven by a motor 28 through a speed reduction unit 29. The speed reduction unit also drives a gear 31 which has teeth in mesh with the teeth of the gear 24 for driving the head 22 and the roll 21 in synchronism with the movement of the carriage 12 therealong. The head 22 drives a dog 32 which is secured to the adjacent end of the roll 21. With this arrangement the carriage 12 is moved along the roll at a predetermined speed relative to the rotation thereof so that the band of molten material laid on the roll will engage the edge of the band section laid prior thereto so that during each rotation of the roll the carriage will move substantially the width of the band. Since between 7 to 10 inches of the band is applied in a minute's time and since the carriage travels the width of the band each rotation, a speed reducing unit 30 is mounted in the drive of the gears 24 and 31 to change the speed of advancement of the carriage 12 to correspond to the diameter of the roll.

As illustrated in FIG. 2, the roll 21 is preheated in a furnace 33 by a fuel nozzle 34 at the starting end of the roll. The roll with a removable washer at each end is heated until the starting end is substantially 450° F. while the opposite end is approximately 250° F. By the time the roll is mounted in the machine of FIG. 1, the heated end will be at least 400° F. at the time of starting the molten band and a temperature of between 400° and 450° F. is maintained in the area of the band by the heat of the arc. The heat will extend a few inches ahead of the welding head 15 so that the temperature of the roll at the welding head will be between 400° and 450° F. at the time the fusion occurs. While the heat of the puddle of alloy material is extremely hot, in the order of 3000° or more, the roll is heated to approximately 600° in the weld area. The puddle of fused material blends into the edge of the band section fused in the prior 360° rotation of the roll and into the skin of the roll.

A microphotograph through the roll and the layer of fused material shows no junction when the material of the roll and the weld material are the same. There is no foreign material included in the layer or in the line of junction between the band sections and the layer and the metal of the roll.

In FIG. 9 a roll 21 is illustrated wherein a continuous band 36 of the weld material is applied to the surface of the roll by the head 15. It will be seen that in each rotation of the roll 21 the band has advanced a distance substantially equal to the width of the band being applied by the oscillated or reciprocated head 15. Due to the oscillation or reciprocation of the head 15 and the rotation of the roll 21, the path of travel of the welding wire will be a zig-zag one, as illustrated diagrammatically at 37. To start the band at the beginning end of the roll and to terminate the band at the end of the roll, a washer-like collar 38, illustrated in broken lines, is mounted on each end of the roll before heating and is readily removable after the weld material has been applied thereon by machining the weld material from the junction of the collar and roll. In this manner, weld material will be applied to the very ends of the roll.

From 50 to 70 pounds of the powdered material can be applied in an hour's time to the roll as the 1⅜ inch band is advanced 7 to 10 inches per minute. The above ratios are given by way of example but may vary substantially from these amounts depending upon a change in applied current, the rate of feed of the powder material and the change in speed of the drive for the roll and the carriage. It is to be understood that the same oscillation or reciprocation of the welding head may be employed on flat or other shaped pieces by laying adjacent bands of the material on the surface and indexing after completing each band.

The wire 13, as illustrated more specifically in FIG. 5, is advanced at a predetermined rate by a pair of wheels 39 driven by a DC motor 41, the speed of which is readily adjustable. The bracket 42 which supports the motor also supports a bearing boss 43 to which a supporting arm 44 is secured by a shaft 45 retained in pivotal position in the boss by a collar 46. The arm 44 supports a powder delivering and welding head 47 for oscillating movement. A shaft 48 is mounted in the delivering head on bearings 49. The shaft supports a drive wheel 51 and a powder measuring and delivering wheel 52. As illustrated in FIG. 7, the wire 13 engages the periphery of the wheel 51 and is held in frictional relation therewith by a wheel 53 which is adjustable toward and away from the drive wheel 51 by a screw 54. The wire is delivered from a conducting finger 55 in the conventional manner.

As illustrated in FIGS. 3 and 5, a current of approximately 400 amperes at 40 volts is delivered to the conducting finger 55 by a cable 56 which is connected by a nut 58 to a conducting plate 57 which is insulated from the head 47. As illustrated in FIG. 1, a conductor 59 is connected to conducting fingers 61 which bear against the end of the roll 21 or the periphery adjacent to the end for completing a circuit between the metal powder on the roll and the end of the wire 13. The transformer for supplying the current at a predetermined voltage to the welding wire and roll is preferably carried by the carriage 12 so that the cables will not change in length as the carriage moves along the roll from one end to the other end thereof. This assures accuracy in the delivery of current at a predetermined rate to the arc.

Figure 6:
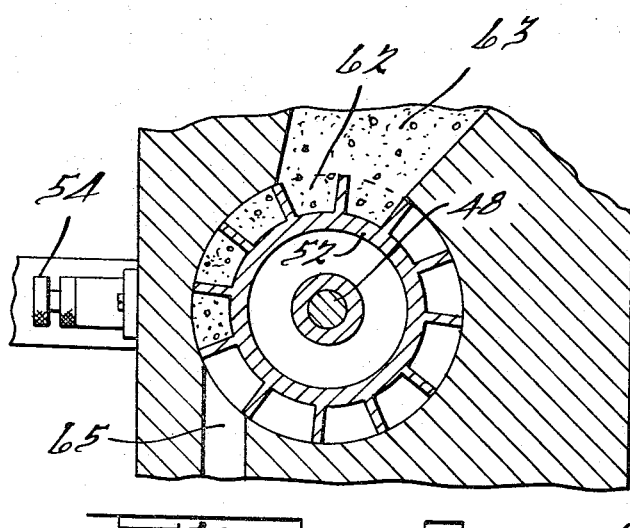
FIG. 6 is an enlarged, broken sectional view of the structure illustrated in FIG. 5, taken on the line 6—6 thereof.

A delivery wheel 52, as illustrated more specifically in FIGS. 5 and 6, is provided with a plurality of peripheral pockets 62 which might be of any capacity depending upon the speed of driving the shaft 48 and the amount of material which is to be delivered to the point of weld. The powder material 63 is delivered from a conduit 64 from a hopper which is adjusted to assure a continuous flow to the head 47. The metal powder fills the pockets 62 and is delivered therefrom through an aperture 65 in the head 67 which communicates with a sleeve 66 on the plate 57. A nozzle 67 is supported by the sleeve 66 to be directly adjacent to the conducting finger 55 and the end of the welding wire 13 projecting therefrom. The nozzle 67 preferably has a wide delivery end 68 extending either side of the wire 13 so as to deliver the metal powder in the same manner in either direction of movement of the wire and, preferably, the nozzle 67 is supported relatively to slide 12 by support means, not shown, so as to remain in a stationary position relatively therewith, sleeve 66 being made of a material substantially flexible. It will be noted that the delivery of the metal powder is exactly synchronized with the feed of the welding wire 13. Since a third more or less of the fused material will be the melted wire 13, its analysis was taken into consideration when preparing the metal powder to produce a predetermined end alloy. The rate of application of the welding wire to the powder material is exactly controlled so that the end alloy applied to the roll or other element will have the exact formula desired. After the material is applied to the collar 38 a portion may be removed and immediately analyzed to ascertain whether or not the materials of the layer is in the proportions desired. Any deficiency may be supplied to the powder material so that the exact analysis will be produced in the layer alloy. It is often found that if the roll material has affinity for carbon that a substantial amount of the carbon of the molten metal and welding wire will be absorbed thereby and this should be ascertained so that an additional amount of carbon may be added to the metal powder to make up for the rate of absorption which will occur.

To oscillate the end of the wire 13 to elongate the molten puddle, a link 71, FIGS. 3, 5 and 8, is secured to the head 47 by a shouldered screw 72. A motor 73, mounted on an extension 74 of the bracket 42, has a shaft 75 which extends through a slot 76 in the link 71. The free end of the link is supported on the shaft and a collar 77 on the end of the shaft retains the link thereon. The shaft 75 supports a cam 78 which is oval or heart shaped, the periphery of which engages a pair of rollers 79 which are supported for free rotation on journals defined by bolts or screws 81 carried by the link 71. The diameters across the cam 78 are equal at all points so that engagement is maintained at all times with the rollers 79. The shape of the cam is computed to have the link 71 move at a constant rate forwardly and backwardly to oscillate the head 47 and therefore the end of the wire 13 at a uniform speed of travel at all points in the oscillating movement thereof. The head 47 will oscillate without interfering with the welding wire 13 as will be seen from the location of the wire in FIG. 7. The distance between the shaft 45 and the end of the wire 13 is substantially 13 inches and the travel of the end of the wire in oscillation in the example illustrated is approximately 1⅜ inches. With this length of the moment arm very little change in the position of the end of the wire from the surface of the roll will occur between the center and the end of the slight arc of movement.

When it is desired to form a wide band of from 2 to 6 inches, then it is desirable to have the welding head reciprocate in a straight line as illustrated in FIG. 10. The head 47 is mounted on ways 82 for reciprocating movement produced by the cam 78 or other means such as a double-acting ram, the speed being controlled by the bleeding of the liquid from the end opposite to that producing the power stroke. Should the degree of travel be such as to interfere with the feed of the welding wire 13, the welding wire may be enclosed in a casing such as that of a Bowden wire, which is secured at both ends and which guides the wire in its advancement even though it is not fed in a straight line.

The molten puddle is produced by moving the arc backward and forwardly in a zig-zag path relative to the surface to which the metal is applied. The metal powder is delivered to the workpiece adjacent to the end of the welding wire 13 in the same manner whether the wire is moving to the right or left transversely of the length of the band, while the metal powder is fed by way of sleeve 66 preferably maintained in a stationary position relatively to carriage 12 of FIG. 1. This transverse movement of the wire produces a wide band of material which advances across the workpiece as the latter moves toward the welding head. This zig-zag movement of the end of the welding rod is timed with the rotation of the roll and the advancement of the welding head therealong so that a predetermined thickness of fused material will be applied to the roll surface. The layer may be 5/16 of an inch or more in thickness and is produced without cracks, dross, oxides or entrapped materials. The layer of the alloy material is solid throughout the entire surface of the roll. As the powder material is laid upon the surface of the workpiece and a molten pool of the material is formed, a neutral flux is applied thereover. As shown in FIGS. 3 and 5, a tube 83 conducts the flux material to a funnel-like element 84 supported about the conducting finger 58. The element 84 delivers the flux material over the molten metal to shield the arc and insulate the metal against too rapid a loss of heat as the puddle of material is continuously advanced and a remote portion is being cooled. The flux material is fed from a hopper into the tube 83 and the flow is readily controlled by the material as it passes from the funnel element 84.

It will be noted from FIG. 5 that the delivering and welding head is mounted on a radius disposed forwardly of the vertical radius of the roll. This permits the puddle to be formed on the advancing side of the roll so that it will be cooled sufficiently after it passes beyond the vertical radius to keep it from flowing down the back side of the roll.

What is claimed is:

1. In a welding machine, a welding head including first means for supporting and delivering a welding wire toward a workpiece, second means for delivering powder metal in a band of a predetermined width upon said workpiece in advance of said welding wire and third means for delivering atmosphere shielding granulated flux material about the end of said welding wire and on the top of said powder metal, means for driving said workpiece and said welding head relatively to each other substantially along the axis of said band and means for reciprocating said first means such as to reciprocate the end of said welding wire substantially at right angle to the axis of said band with a uniform speed, said reciprocating means comprising a link having an end attached to said first means, a longitudinal slot in said link, a pair of rollers each carried by said link proximate each end of said slot and with the axis of rotation of each said roller substantially at right angle to the longitudinal axis of said slot, means engaging said slot for preventing motion of said link other than along the longitudinal axis thereof and a driving constant diameter cam rotatable around an axis perpendicular to the longitudinal axis of the slot, said cam being disposed between said rollers so as to continuously engage a peripheral surface thereof, and being shaped such as to cause constant velocity reciprocation of said link.

2. In a welding machine as claimed in claim 1, wherein the workpiece is a roll and the welding head is supported by a carriage movable therealong, means for driving the roll and carriage in synchronism to each other for advancing the carriage substantially the length of the reciprocating movement of the welding wire each time the roll is rotated 360°.

3. A welding machine as claimed in claim 2, further comprising means provided for changing the relative speed of the roll and carriage to conform to a change in roll diameter resulting from welding to the roll surface a continuous layer formed by melting said welding wire and said powdered metal.

4. A welding machine as claimed in claim 3 wherein the rotation of the roll and the reciprocating movement of the welding wire produce a relative zig-zag movement to the wire to form a continuous spiral ribbon on the roll as the roll rotates and the carriage advances.

References Cited

UNITED STATES PATENTS

| | | | |
|---|---|---|---|
| 1,159,383 | 11/1915 | Holsten | 219—76 X |
| 1,298,590 | 11/1919 | Smith | 219—60 |
| 1,512,787 | 10/1924 | Morton | 219—137 |
| 1,933,340 | 10/1933 | Raymond | 219—124 |
| 2,427,350 | 9/1947 | Carpenter et al. | 219—76 |
| 2,649,528 | 8/1953 | Koenig et al. | 219—137 |
| 2,709,213 | 5/1955 | Gibson | 219—76 |
| 2,927,990 | 3/1960 | Johnson | 219—73 |
| 3,019,327 | 1/1962 | Engel | 219—76 |
| 3,185,814 | 5/1965 | Rossner et al. | 219—76 |
| 3,264,445 | 8/1966 | Arnoldy | 219—76 |

RICHARD M. WOOD, *Primary Examiner.*